R. T. MORGAN.
RESILIENT WHEEL.
APPLICATION FILED JAN. 5, 1915.
1,186,119.
Patented June 6, 1916.
2 SHEETS—SHEET 1.
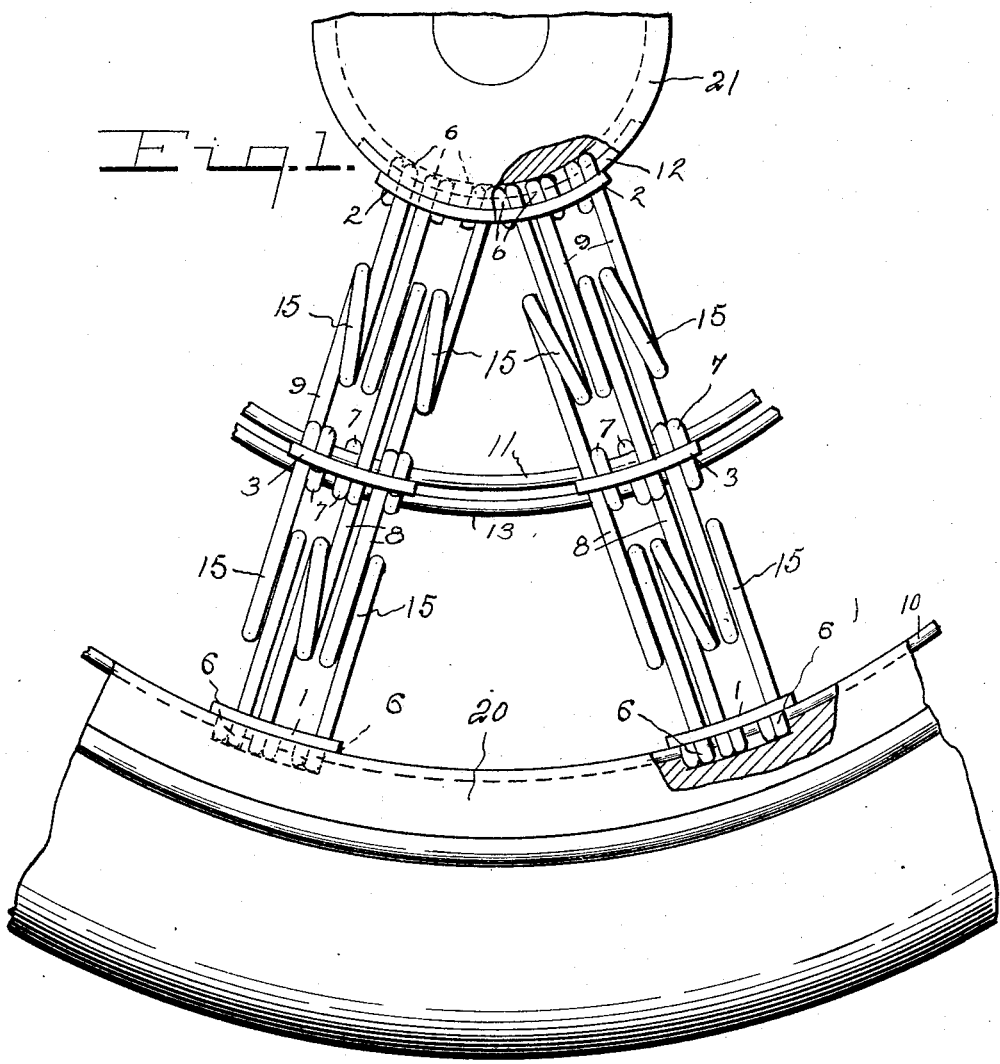
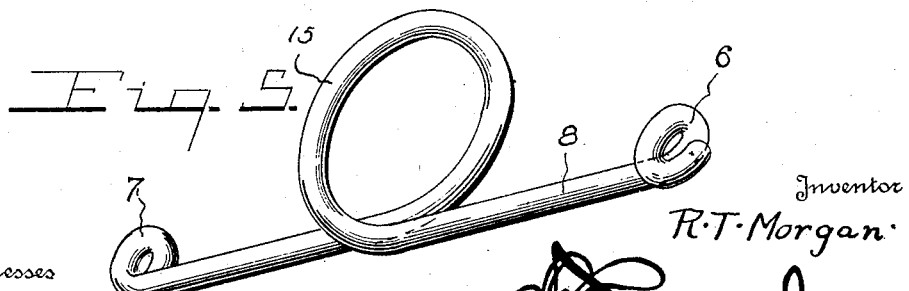

R. T. MORGAN.
RESILIENT WHEEL.
APPLICATION FILED JAN. 5, 1915.
1,186,119.
Patented June 6, 1916.
2 SHEETS—SHEET 2.
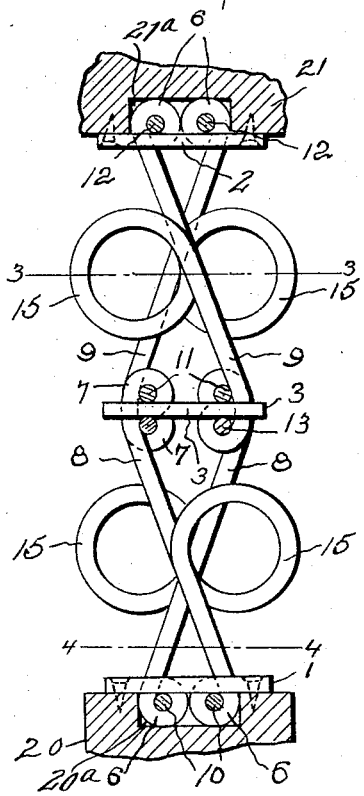
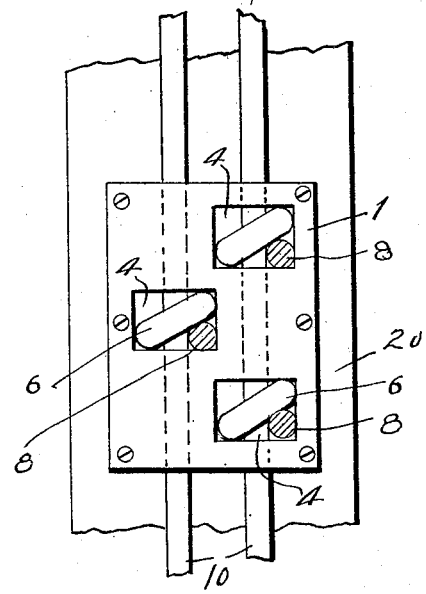
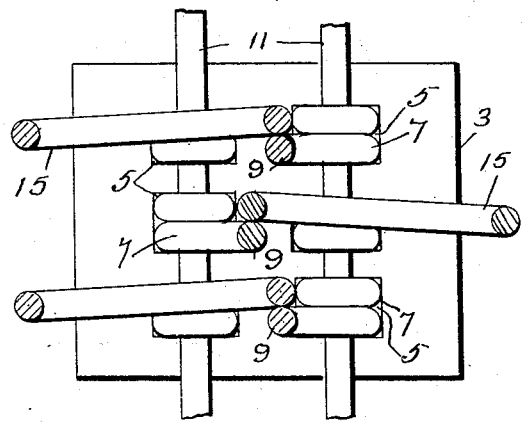
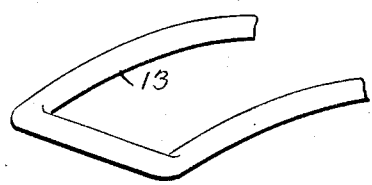
Inventor
R. T. Morgan

UNITED STATES PATENT OFFICE.

ROY T. MORGAN, OF INDEPENDENCE, MISSOURI.

RESILIENT WHEEL.

1,186,119.  Specification of Letters Patent.  Patented June 6, 1916.

Application filed January 5, 1915. Serial No. 646.

*To all whom it may concern:*

Be it known that I, ROY T. MORGAN, a citizen of the United States, residing at Independence, in the county of Jackson and State of Missouri, have invented certain new and useful Improvements in Resilient Wheels; and I do hereby declare the following to be a full, clear, and exact description of the invention, such as will enable others skilled in the art to which it appertains to make and use the same.

This invention relates to resilient wheels and more particularly to a resilient spoke for use in the construction of vehicle wheels.

The primary object of this invention is to provide a spoke for vehicle wheels which is resilient, so as to absorb shocks contingent with the use of the wheel and eliminate the necessity of employing pneumatic tires, or where pneumatic tires are employed for increasing the shock absorbing proclivities of the wheel and relieving the vehicle springs of considerable strain.

Another object of this invention is to construct a spoke as specified of a plurality of resilient rods or springs which are coiled intermediate their ends to form resilient shock absorbing convolutions, and to attach these springs in cross wise relation to each other to suitable supporting plates.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a fragmentary view of the resilient wheel constructed in accordance with this invention. Fig. 2 is a side elevation of one of the resilient spokes. Fig. 3 is a cross sectional view on the line 3—3 of Fig. 2. Fig. 4 is a cross sectional view on the line 4—4 of Fig. 2. Fig. 5 is a detail perspective view of one of the resilient or spring units of which the hub is made, and Fig. 6 is a fragmentary perspective view of a tying pin used in the construction of the improved resilient spoke.

Referring more particularly to the drawings, 1, 2 and 3 designate rectangular plates, which form rim, hub, and center supporting plates for the spoke structures of the wheel. The rim and hub plates 1 and 2, are each provided with three rectangular openings 4 disposed in staggered relation to each other, and the center plate 3 is provided with six openings 5 arranged in rows of three each. The openings 4 are provided for the insertion therethrough of the coiled ends 6 of resilient rods 8 and 9 which coact with the plates for forming spoke structures. The resilient rods 8 extend inwardly from the rim 20 of the wheel and have their ends coiled as shown at 7, which coiled ends extend through certain of the openings 5 formed in the center plate 3. The rods 9 extend outwardly from the hub 21 of the wheel and have their outer ends coiled as shown at 7, which coiled ends extend through certain of the openings 5 in the center plate 3. The rim 20 of the wheel is provided with an annular recess as shown at 20ª, and the coiled ends 6 of the rods 8 extend into the annular recess. A substantially U-shaped tying rod 10 is inserted through the openings formed centrally in the coiled ends 6 and extends entirely about the circumference of the wheel holding the coiled ends 6 in their proper position. The hub 21 is also provided with annular recess 21ª in which the coiled ends 6 of the rods 9 extend. A substantially U-shaped tying rod 12 is inserted through the openings formed centrally in these coiled ends and it extends about the circumference of the hub, for preventing accidental disconnection of the rods and the hub 21. The outer coiled ends 7 of the rods 9 are placed upon the sides of the center plates away from the hubs 21, and a substantially U-shaped rod 13 is inserted through the central opening in the coil for connecting the rods 9 to the plate 3 and preventing accidental disconnection of the rods and the center plate. The inner coiled ends 7 of the rods 8 are tied to the center plate 3 by a substantially U-shaped rod 11 which extends through the central openings in the coils. The rods 11 and 13 extend about the circumference of the wheel and brace the central plate 3 and the inner ends of the rods 8 and 9 against lateral movement.

The resilient rods 8 and 9 are coiled intermediate their ends as is clearly shown at 15 to form resilient convolutions for increasing the shock absorbing proclivities of the rods, and these rods are further disposed in cross relation to each other, as they extend from the central plate 3 to the respective plate 1 or 2 to which they are connected, as is clearly shown in Fig. 1 of the drawings, positioning the main portion of the resilient convolutions outwardly or positioning the resilient convolutions so that they extend outwardly from each other at the point of crossing of the resilient rods.

In constructing the resilient spokes, any desired number of the resilient rods may be employed, each rod being disposed in cross relation with the one next thereto and in parallel relation with each alternate rod. The plates 1 and 2 may be secured in any suitable manner to the wheel rim 20 and the wheel hub 21. Any desired number of spokes composed of the resilient rods and plates heretofore described may be employed in the construction of a wheel so as to render the necessary resiliency thereto.

In reducing the invention to practice certain minor features of construction, combination and arrangement of parts may necessitate alterations to which the patentee is entitled provided such alterations are comprehended within the scope of what is claimed.

What is claimed is:—

1. In a resilient wheel structure, a rim, a hub, a plurality of spaced rods extending circumferentially about the wheel substantially equidistant of the hub and rim, and cross spokes connected to said rods and extending to said rim and said hub, said rods bracing the meeting ends of said spokes against independent lateral movement.

2. In a resilient wheel structure, a resilient spoke comprising a plurality of plates spaced from each other, a plurality of resilient rods having their terminal ends coiled for forming loops, said plates being provided with a plurality of openings extending therethrough through which said coiled ends project, and a plurality of rods for insertion through the openings formed by the coiling of said ends for engagement with said plates for attaching said resilient rods to said plates.

3. In a resilient wheel structure, a resilient hub comprising a plurality of plates spaced from each other, a plurality of resilient rods having their terminal ends coiled for forming loops, said plates being provided with a plurality of openings extending therethrough through which said coiled ends project, and a plurality of rods for insertion through the openings formed by the coiling of said ends for engagement with said plates for attaching said resilient rods to said plates, said resilient rods being disposed in cross relation with the one next thereto and parallel with each alternate rod in the spoke construction.

4. In a resilient wheel structure, a resilient spoke comprising a plurality of plates provided with openings extending therethrough, a plurality of resilient rods having their ends rolled for forming loops, said loops extending through said openings, a plurality of U-shaped rods for insertion through said loops and engagement with the surfaces of said plates for holding said resilient rods connected to said plates, said resilient rods being disposed in cross relation with the one next thereto and parallel with each alternate rod of which said spoke structure is formed, said resilient rods further coiled intermediate their ends to form resilient shock absorbing convolutions.

5. In a resilient wheel structure, the combination, of a rim, a hub, and a plurality of resilient spokes connected to said rim and hub, said spokes being composed of crossed resilient rods being bent intermediate their ends to form resilient convolutions, the convolution upon one rod extending in an opposite direction from the convolution upon the rod which crosses the same.

6. In a resilient wheel structure, the combination, of a rim, a hub, and a plurality of resilient spokes connected to said rim and hub, said spokes being composed of crossed resilient rods being bent intermediate their ends to form resilient convolutions, the convolution upon one rod extending in an opposite direction from the convolution upon the rod which crosses the same, said rods extending inwardly from the rim and outwardly from the hub and terminating substantially equidistant of the rim and hub, plates connected into the ends of said rods which are free from connection to the rim and hub, and rods extending circumferentially about the wheel and connected to the ends of said rods which are free from connection to said rim and hub, for bracing the rods against lateral movement.

In testimony whereof I affix my signature in presence of two witnesses.

ROY T. MORGAN.

Witnesses:
W. B. KELLEY,
ALLIE RENDLEMAN.